(12) United States Patent
Niwata et al.

(10) Patent No.: US 10,808,777 B2
(45) Date of Patent: Oct. 20, 2020

(54) FRICTION ENGAGEMENT DEVICE

(71) Applicant: Honda Motor Co., Ltd., Tokyo (JP)

(72) Inventors: Kenji Niwata, Saitama (JP); Motonobu Ikari, Saitama (JP); Sachi Fujinuma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 16/185,021

(22) Filed: Nov. 9, 2018

(65) Prior Publication Data

US 2020/0149599 A1    May 14, 2020

(51) Int. Cl.
| | |
|---|---|
| *F16D 48/06* | (2006.01) |
| *F16D 25/0638* | (2006.01) |
| *F16D 13/38* | (2006.01) |
| *F16D 121/04* | (2012.01) |

(52) U.S. Cl.
CPC ........... *F16D 48/066* (2013.01); *F16D 13/38* (2013.01); *F16D 25/0638* (2013.01); *F16D 2121/04* (2013.01); *F16D 2500/1026* (2013.01); *F16D 2500/5023* (2013.01)

(58) Field of Classification Search
CPC .... F16D 48/066; F16D 13/38; F16D 25/0638; F16D 2121/04; F16D 2500/1026; F16D 2500/5023; F16D 48/06
See application file for complete search history.

(56) References Cited

FOREIGN PATENT DOCUMENTS

| | | |
|---|---|---|
| JP | 2002340019 | 11/2002 |
| JP | 2017172763 | 9/2017 |

*Primary Examiner* — Huan Le
(74) *Attorney, Agent, or Firm* — JCIPRNET

(57) ABSTRACT

The friction engagement device connects the input shaft and the output shaft to transmit a driving force from a driving source from the input shaft to the output shaft. The friction engagement device includes a housing, a friction engagement portion, a piston, an oil pump, and a motor. The housing is disposed between the input shaft and the output shaft. The friction engagement portion is disposed in the housing and composed of a plurality of friction components. The piston is disposed at one side of the friction engagement portion for pressing the friction engagement portion. The oil pump is used to operate the piston. The motor is used to drive the oil pump. In the friction engagement device, abnormal wear of the friction components of the friction engagement portion is detected by monitoring a value of an operation parameter of the friction engagement device.

7 Claims, 3 Drawing Sheets

FRICTION ENGAGEMENT DEVICE

BACKGROUND

Technical Field

The disclosure relates to a friction engagement device served as a clutch, a brake, and the like in a driving force transmission device.

Description of Related Art

In related art, a driving force transmission device mounted on vehicles includes a hydraulic type of friction engagement device (for example, a clutch or a brake). As this type of friction engagement device, it generally includes a housing, a plurality of friction components disposed in the housing, and a piston disposed on one side of the friction components, and the piston can press the friction components by being pushed through oil pressure of an oil pump driven by a motor. However, when the surfaces of the friction components have scratches and burrs, the friction engagement device constructed by the friction components generates abnormal wear. On this occasion, the size of the wear powder generated by the friction components becomes large and the wear powder may be generated in a large amount in a short time, causing an oil strainer connected to the friction engagement device to be clogged, and thus the impedance of the oil strainer increases. On this occasion, it is difficult for the oil strainer to suck in oil; as a result, the oil pressure from the oil pump drops to failure. Accordingly, the amount of stroke of the piston increases, and the amount of change in operation parameters such as the current value/torque of the motor also increases, which causes that the responsiveness of the oil pressure to be deteriorated, and the component is likely to fall off.

Therefore, in Patent Document 1, the friction engagement device includes a relief valve provided in an oil chamber in which the piston is located. In the process that the piston is moved relative to the friction components, a valve elastic component of the relief valve is also moved. When the piston moves more toward the friction components than in the normal case, the force applied by the valve elastic component lowers the oil pressure in the oil chamber, thereby detecting whether or not the friction components generates abnormal wear (that is, whether or not the oil pressure value is lower than the reference value). Furthermore, in Patent Document 2, the friction engagement device includes an elastic component and a load sensor disposed in a space in which the piston is located. In the process where the piston is moved relative to the friction components, the elastic component is also moved, and the load sensor is capable of detecting the compression load of the elastic component, thereby detecting whether or not the friction components generates abnormal wear (that is, whether or not the amount of change in the compression load exceeds the reference value), and notifying the driver of the warning information regarding the abnormal wear through a control component.

[Patent Document 1] Japanese Laid-open No. 2017-172763

[Patent Document 2] Japanese Laid-open No. 2002-340019

In the related art, as described in Patent Documents 1 and 2, it is generally required to provide an additional elastic component in the oil chamber in which the piston is located or to further provide a sensor to detect the abnormal wear of the friction components, which increases the components and costs required for the friction engagement device.

SUMMARY

The disclosure provides a friction engagement device capable of estimating whether or not an abnormal wear is generated in a friction engagement portion by monitoring an operation parameter of a component provided in the friction engagement device.

The friction engagement device of an embodiment of the disclosure connects to an input shaft and an output shaft to transmit a driving force from a driving source from the input shaft to the output shaft. The friction engagement device includes a housing, a friction engagement portion, a piston, an oil pump, and a motor. The housing is disposed between the input shaft and the output shaft. The friction engagement portion is disposed in the housing and is composed of a plurality of friction components. The piston is disposed at one side of the friction engagement portion for pressing the friction engagement portion. The oil pump is used to operate the piston. The motor is used to drive the oil pump. In the friction engagement device, abnormal wear of the friction components of the friction engagement portion is detected by monitoring a value of an operation parameter of the friction engagement device.

DESCRIPTION OF THE EMBODIMENTS

Figure 1:
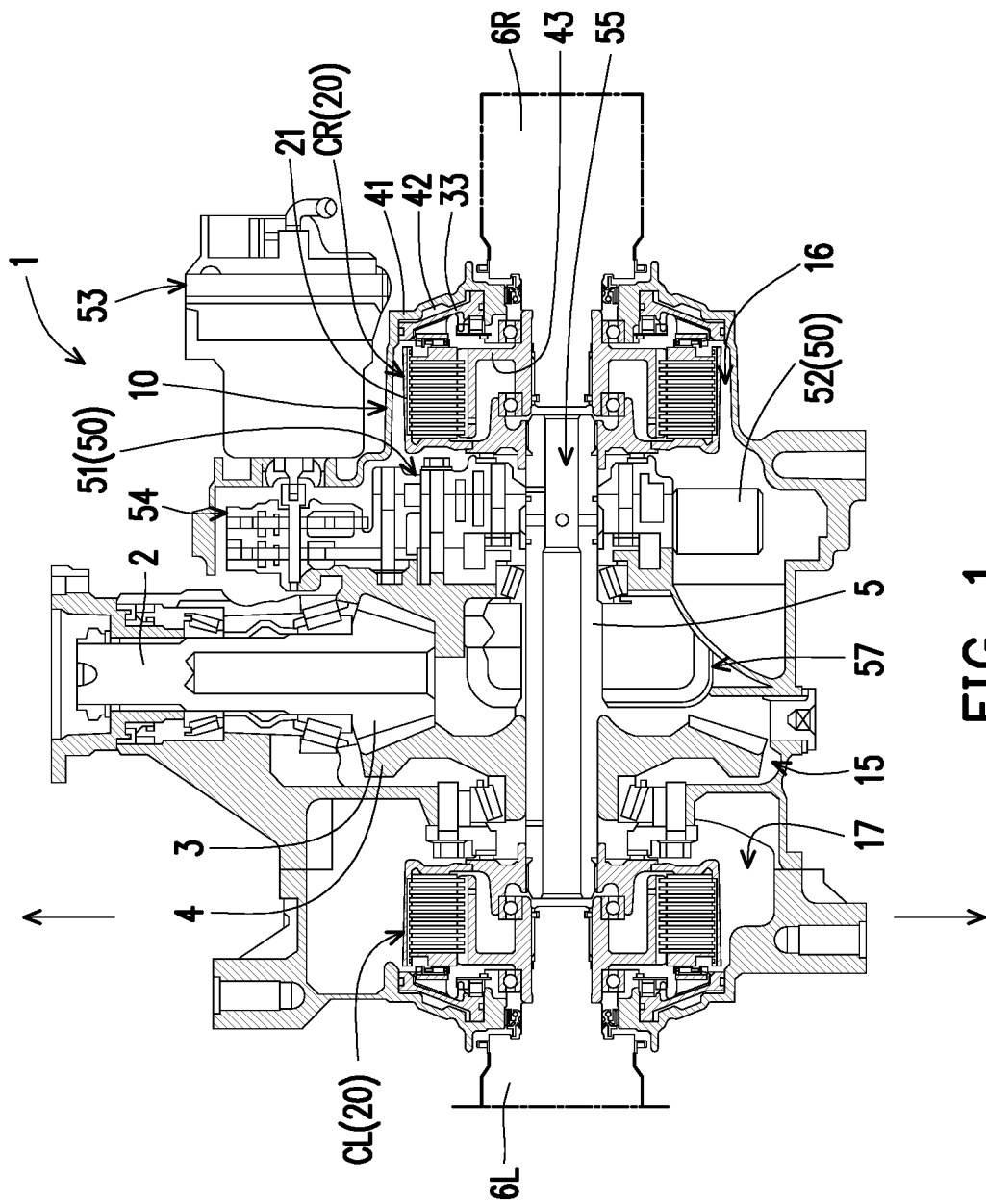
FIG. 1 is a cross-sectional view of a driving force transmission device 1 having a friction engagement device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a cross-sectional view of a driving force transmission device 1 having a friction engagement device 20 according to an embodiment of the disclosure. Referring to FIG. 1, in the exemplary embodiment, it is exemplified that the friction engagement device 20 serves as a right clutch CR and a left clutch CL and is applied to the driving force transmission device 1. The driving force transmission device 1 includes a pinion shaft 2 connected to a propeller shaft (not shown) that is rotationally driven by a driving force transmitted from an engine (i.e., a driving source) not shown, a pinion gear 3 formed at the front end of the pinion shaft 2, and a ring gear 4 engaged with the pinion gear 3. Further, the ring gear 4 is mounted on the outer circumference of an input shaft 5 disposed coaxially with a left axle 6L and a right axle 6R. In this manner, when the pinion shaft 2 is rotationally driven by the engine and the propeller shaft, the driving force is transmitted to the input shaft 5 via the pinion gear 3 and the ring gear 4, so that the input shaft 5 is also rotated together.

On the end portion of the input shaft 5 on which the ring gear 4 is mounted, the left clutch CL that transmits a driving force between the input shaft 5 and the left axle 6L is provided, and on another end portion of the input shaft 5 opposite to the ring gear 4, the right clutch CR that transmits a driving force between the input shaft 5 and the right axle 6R is provided. Herein, the right clutch CR and the left clutch CL are the friction engagement device 20. The aforementioned rotation of the input shaft 5 may be transmitted to the left axle 6L and the right axle 6R serving as output shafts via the right clutch CR and the left clutch CL. The housing 10 of the driving force transmission device 1 may be divided into a gear chamber 15 in the center, and a right clutch chamber 16 and a left clutch chamber 17 on opposite sides of the gear chamber 15. The pinion gear 3 and the ring gear 4 are disposed in the gear chamber 15, the right clutch CR is disposed in the right clutch chamber 16, and the left clutch CL is disposed in the left clutch chamber 17.

Further, a hydraulic oil supply portion 50 is disposed in the right clutch chamber 16. The hydraulic oil supply portion 50 includes a valve body 51 and a linear solenoid valve 52, the hydraulic oil is supplied to the valve body 51 and the linear solenoid valve 52 through the motor 53 drives the oil pump 54, thereby supplying the hydraulic oil to the left clutch CL and the right clutch CR via the valve body 51 and the linear solenoid valve 52. Further, a hydraulic oil channel 55 is formed in the input shaft 5 for guiding the hydraulic oil from the valve body 51 and the linear solenoid valve 52 to the right clutch CR. Although it is not shown, the hydraulic oil discharged from the valve body 51 and the linear solenoid valve 52 passes through the input shaft 5 and is also guided to the left clutch CL. Further, an oil strainer 57 is disposed in the gear chamber 15 and connected to the friction engagement device 20 serving as the right clutch CR and the left clutch CL. The oil strainer 57 has a suction port (not shown) for sucking the hydraulic oil underneath, the hydraulic oil accumulated in the gear chamber 15 may be sucked through the suction port.

Figure 2:
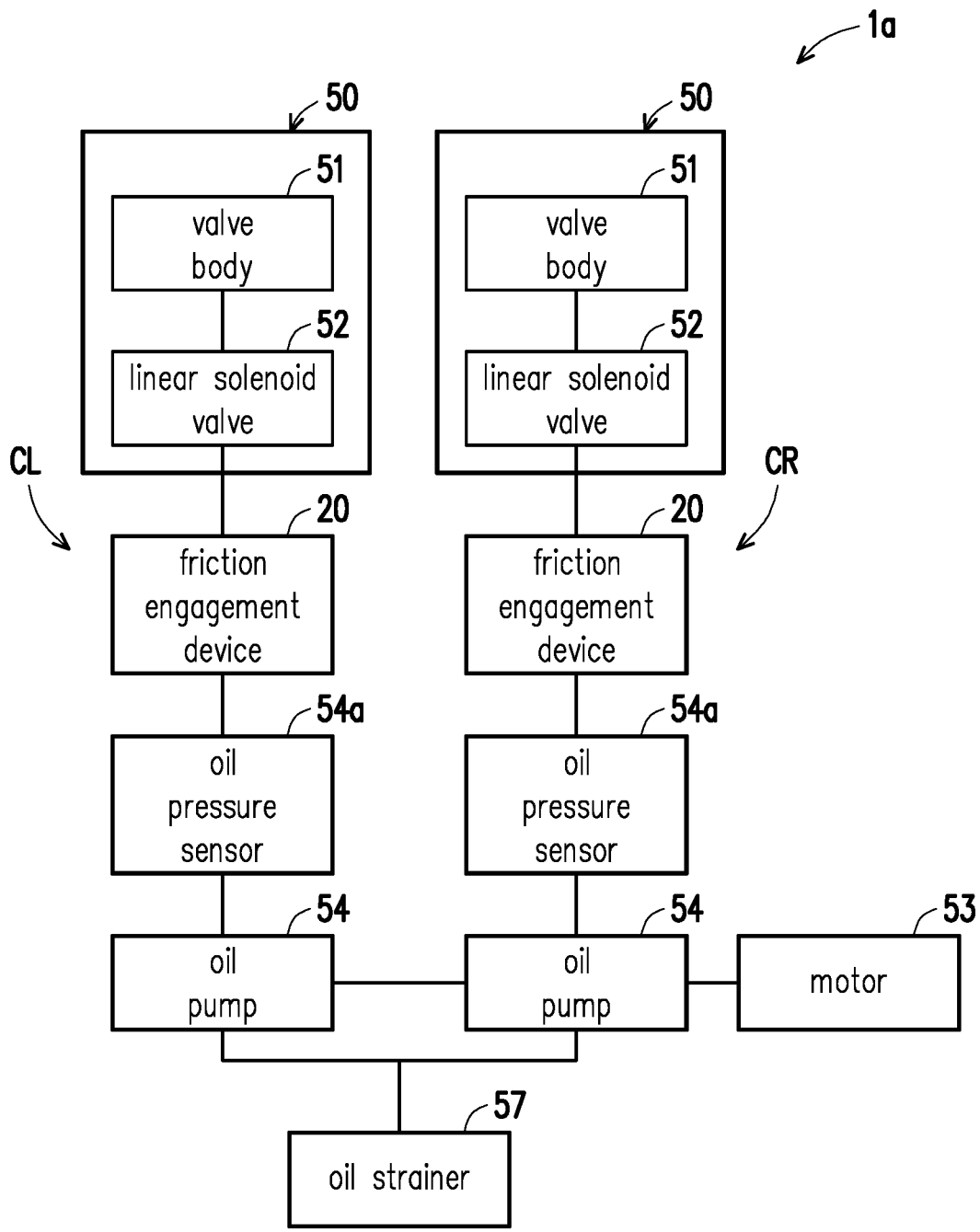
FIG. 2 is a block diagram of another driving force transmission device having a friction engagement device according to an embodiment of the disclosure.

The above description regarding the structure of the driving force transmission device 1 is merely one of the embodiments of the disclosure, and the disclosure is not limited thereto. The structural construction of the driving force transmission device 1 may be adjusted according to needs. For example, FIG. 2 is a block diagram of another driving force transmission device 1a having the friction engagement device 20 according to an embodiment of the disclosure. The structural construction similar to FIG. 1 is omitted from FIG. 2, and the main difference is that, in the embodiment of FIG. 2, two sets of friction engagement devices 20 serving as the right clutch CR and the left clutch CL are correspondingly provided with two sets of hydraulic oil supply portions 50 and two oil pumps 54. The two sets of hydraulic oil supply portions 50 and the two oil pumps 54 are respectively disposed in the right clutch chamber 16 and the left clutch chamber 17 as shown in FIG. 1, and are respectively connected to the corresponding friction engagement devices 20 (i.e., respectively connected to the right clutch CR and left clutch CL). Please refer to the foregoing embodiment for the description regarding the hydraulic oil supply portion 50, the motor 53, the oil pump 54, and the oil strainer 57. In this manner, the corresponding oil pump 54 is driven by the motor 53 to supply the hydraulic oil to the corresponding valve body 51 and the corresponding linear solenoid valve 52, thereby supplying the hydraulic oil to the corresponding left clutch CL or the corresponding right clutch CR via the corresponding valve body 51 and the corresponding linear solenoid valve 52. Accordingly, the structural construction for guiding the hydraulic oil from the right clutch chamber 16/the right clutch CR to the left clutch chamber 17/the left clutch CL can be omitted. It can be obtained that the friction engagement device 20 proposed by the disclosure may be applied to the driving force transmission device 1 or 1a of various structural constructions, that is, the structural construction of the driving force transmission device 1 or 1a to which the friction engagement device 20 is applied may be adjusted according to needs. Further, although the friction engagement device 20 is exemplified as a clutch in the disclosure, the disclosure is not limited thereto.

Figure 3:
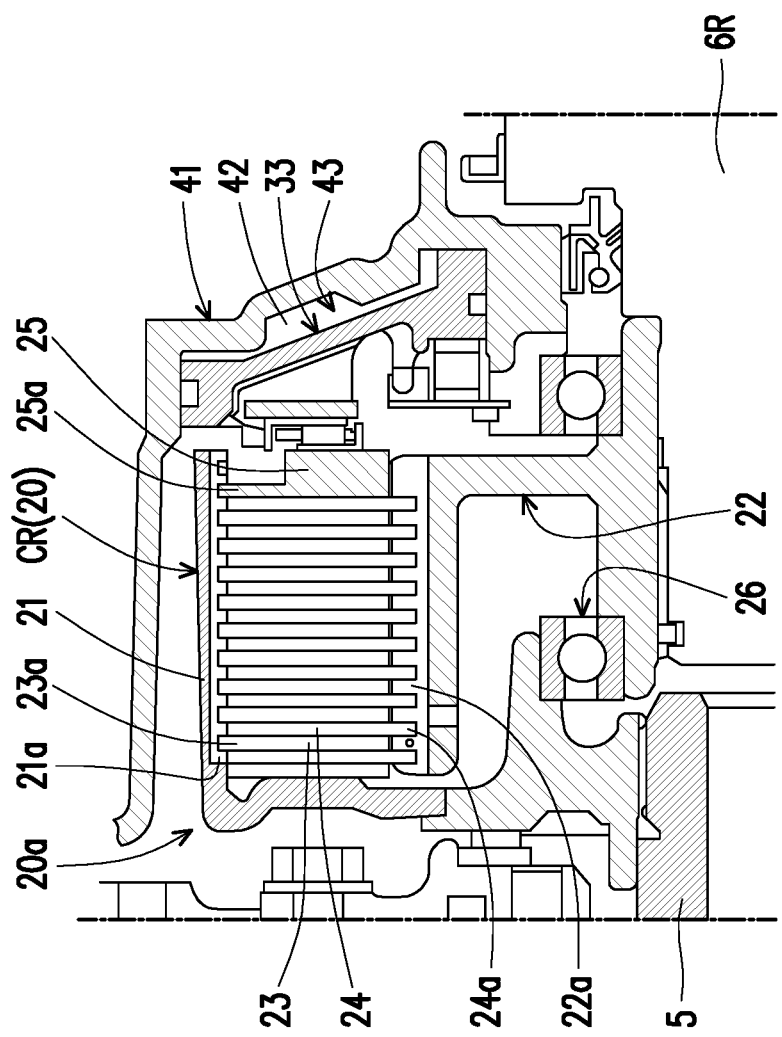
FIG. 3 is a partially enlarged cross-sectional view illustrating the friction engagement device in FIG. 1.

FIG. 3 is a partially enlarged cross-sectional view illustrating the friction engagement device in FIG. 1. In the embodiment of FIG. 3, the upper half of the friction engagement device 20 serving as the right clutch CR in FIG. 1 is enlarged as an illustration. The friction engagement device 20 serving as the right clutch CR connects the input shaft 5 and the right axle 6R serving as an output shaft to transmit the driving force from the driving source (i.e., the aforementioned engine) from the input shaft 5 to the output shaft/right axle 6R. Specifically, the friction engagement device 20 serving as the right clutch CR includes a housing composed of an outer guide portion 21 and an inner guide portion 22, and a friction engagement portion 20a disposed in the housing and composed of a plurality of friction components, wherein the outer guide portion 21 is coupled to the input shaft 5, and the inner guide portion 22 is disposed on the inner diameter side of the outer guide portion 21 and coupled to the output shaft/right axle 6R, such that the housing is disposed between the input shaft 5 and the output shaft/right axle 6R, and the friction engagement portion 20a composed of a plurality of friction components is disposed between the outer guide portion 21 and the inner guide portion 22. Further, a bearing 26 is provided between the outer guide portion 21 and the inner guide portion 22 to rotatably support the outer guide portion 21 and the inner guide portion 22.

Further, the friction components of the friction engagement portion 20a includes a pressure plate 23 and a friction plate 24. The pressure plate 23 and the friction plate 24 are alternately stacked along the axial direction (i.e., the extending direction of the input shaft 5 and the output shaft/right axle 6R) and disposed between the outer guide portion 21 and the inner guide portion 22 serving as the housing. Here, the pressure plate 23 is provided with engagement external teeth 23a at the outer peripheral edge, and the engagement external teeth 23a are engaged corresponding to an engagement inner groove 21a formed at the inner peripheral edge of the outer guide portion 21. Similarly, the friction plate 24 is provided with engagement internal teeth 24a at the inner peripheral edge, and the engagement internal teeth 24a are engaged corresponding to an engagement outer groove 22a formed at the outer peripheral edge of the inner guide portion 22. Further, an end plate 25 is provided on one side of the overlapping direction of the pressure plate 23 and the friction plate 24 serving as the friction components of the friction engagement portion 20a. Specifically, the end plate 25 is provided with engagement external teeth 25a at the outer peripheral edge, and the engagement external teeth 25a are engaged corresponding to an engagement inner groove 21a formed at the inner peripheral edge of the outer guide portion 21.

Further, the piston 33 is provided on one side of the overlapping direction of the pressure plate 23 and the friction plate 24 serving as the friction components of the friction engagement portion 20a. More specifically, the piston 33 is disposed on the opposite side of the end plate 25 with respect to the friction components (i.e., the pressure plate 23 and the friction plate 24) such that the end plate 25 is disposed between the friction components (i.e., the pressure plate 23 and the friction plate 24) and the pistons 33. In this manner, the piston 33 faces the end plate 25, and can press the end plate 25 and the friction components (i.e., the pressure plate 23 and the friction plate 24) of the friction engagement portion 20a by movement. Additionally, the piston 33 is accommodated in an accommodating portion 43 of a piston housing 41. The accommodating portion 43 is an annular recess formed by recessing the piston housing 41 inward in the axial direction facing the friction components (i.e., the pressure plate 23 and the friction plate 24). The piston 33 is an annular plate-shaped component provided in the accommodating portion 43. Further, a gap between the inner surface of the accommodating portion 43 and the piston 33 is formed with a piston chamber 42 for generating oil pressure through hydraulic oil, and the piston chamber 42 is communicated with an oil path (not shown) to introduce the hydraulic oil from the oil pump 54 (as shown in FIG. 1) to the piston chamber 42.

Based on the above, the right clutch CR and the left clutch CL are respectively configured in the manner that the end plate 25 is rotatable relative to the pressure plate 23 and the friction plate 24, and the piston 33 can press the end plate 25 by being pushed through the oil pressure from the oil pump 54, thereby respectively fastening or releasing the right clutch CR and the left clutch CL. That is, when the input shaft 5 is rotated, the outer guide portion 21 serving as the housing is rotated together, so that the pressure plate 23 and the friction plate 24 are also rotated accordingly. On this occasion, the oil pump 54 is driven by the motor 53 to cause the piston 33 to operate in the piston chamber 42 to generate movement, and the end plate 25 is pressed by the piston 33 to rotate relative to the outer guide portion 21. After the end plate 25 is rotated to the corresponding engagement position, the piston 33 further presses the friction components (i.e., the pressure plate 23 and the friction plate 24) serving as a friction engagement portion via the end plate 25 in the overlapping direction, thereby respectively fastening or releasing the right clutch CR and the left clutch CL.

In the above process, the friction components (i.e., the pressure plate 23 and the friction plate 24) easily cause wear when rotating. Under normal conditions, the size of the wear powder produced by the friction components is 1 to 20 micrometers (μm). Such wear condition occurs for few times within the use range of the friction engagement device 20/clutch, which does not affect the friction engagement device 20. However, when scratches and burrs are generated on the surface of the friction components (i.e., the pressure plate 23 and the friction plate 24), the size of the wear powder generated by the friction components becomes large (for example, larger than 100 μm), and may be generated in a large amount in a short time. On this occasion, it may be regarded that abnormal wear is generated in the friction engagement portion 20a of the friction engagement device 20. The wear powder which is large in size and generated in a large amount causes the oil strainer 57 connected to the friction engagement device 20 to be clogged, and the impedance of the oil strainer 57 is increased. On this occasion, it is difficult for the oil strainer 57 to suck in oil, causing the oil pressure from the oil pump 54 to drop to failure. As a result, the amount of stroke of the piston 33 increases, and the amount of change in operation parameters such as the current value/torque of the motor 53 also increases, which causes that the responsiveness of the oil pressure to be deteriorated, and the component is likely to fall off. Therefore, in the friction engagement device 20, the abnormal wear of the friction components (i.e., the pressure plate 23 and the friction plate 24) of the friction engagement portion 20a is detected/estimated by monitoring the value of the operation parameter of the friction engagement device 20.

Specifically, in the exemplary embodiment, the operation parameters of the friction engagement device 20 include the current value of the motor 53 for driving the oil pump 54, which is merely one example in the disclosure; the operation parameters of the friction engagement device 20 may also be operation parameters such as the voltage value of the motor 53 for driving the oil pump 54 or the number of rotations of the motor 53, which is not construed as a limitation to the disclosure. Here, the current value of the motor 53 is obtained from the torque of the motor 53. In other words, in the friction engagement device 20, when abnormal wear is generated in the friction components (i.e., the pressure plate 23 and the friction plate 24) of the friction engagement portion 20a, the amount of change in the operation parameters such as the current value/torque of the motor 53 also increases. Therefore, by monitoring the amount of change in the torque of the motor 53 with respect to the traveling distance of the vehicle (not shown), it is possible to determine whether or not the torque/current value complies with the expectation, thereby detecting/estimating the abnormal wear of the friction components (i.e., the pressure plate 23 and friction plate 24) of the friction engagement portion 20a. That is, when the amount of change of the torque/current value of the motor 53 exceeds a preset value within a predetermined time, or the difference between the torque/current value of the motor 53 and a reference value exceeds a preset value, it can be determined that abnormal wear is generated in the friction components (i.e., the pressure plate 23 and the friction plate 24) of the friction engagement portion 20a. The above-described monitoring operation may be performed by a sensor (not shown) provided in the motor 53, or may be performed by a sensor or other components provided in other components of the friction engagement device 20 without additionally providing a component for detection. The disclosure is not limited thereto, and may be adjusted according to needs and actual conditions.

Further, in the case where abnormal wear is generated in the friction components of the friction engagement portion 20a, the large-sized wear powder causes the oil strainer 57 connected to the friction engagement device 20 to be clogged, and the impedance of the oil strainer 57 increases, which makes it difficult for the oil strainer 57 to suck in oil, causing the oil pressure from the oil pump 54 to drop to failure, and the amount of stroke of the piston 33 is increased, resulting in that the amount of change in operation parameters such as the current value/torque of the motor 53 and the like is also increased. In view of the above, the abnormal wear of the friction engagement portion 20a not only can be obtained by monitoring the amount of change in the current value/torque of the motor 53, but also can be obtained by monitoring the amount of change in the impedance value of the oil strainer 57 or the oil pressure value of the oil pump 54. That is, the operation parameters of the friction engagement device 20 also include the oil pressure value of the oil pump 54 or the impedance value of the oil strainer 57.

Specifically, in the friction engagement device 20, when abnormal wear is generated in the friction components (i.e., the pressure plate 23 and the friction plate 24) of the friction engagement portion 20a, the amount of change in the operation parameter such as the impedance value of the oil strainer 57 connected to the friction engagement device 20 is also increased. Therefore, by monitoring the amount of change in the impedance value of the oil strainer 57 with respect to the traveling distance of the vehicle (not shown), it is possible to determine whether or not the impedance value complies with expectations, thereby detecting/estimating the abnormal wear of the friction components (i.e., the pressure plate 23 and the friction plate 24) of the friction engagement portion 20a. That is, when the amount of change in the impedance value of the oil strainer 57 exceeds a preset value within a predetermined time, or the difference between the impedance value of the oil strainer 57 and a reference value exceeds a preset value, it can be determined that abnormal wear is generated in the friction components (i.e., the pressure plate 23 and the friction plate 24) of the friction engagement portion 20a. The above-described monitoring operation may be performed by a sensor (not shown) provided in the oil strainer 57, or may be performed by a sensor or other components provided in other components of the friction engagement device 20 without additionally providing a component for detection. The disclosure is not limited thereto, and may be adjusted according to needs and actual conditions.

Similarly, in the friction engagement device 20, when abnormal wear is generated in the friction components (i.e., the pressure plate 23 and the friction plate 24) of the friction engagement portion 20a, the amount of change in the operation parameters such as the oil pressure value of the oil pump 54 also increases. Therefore, by monitoring the amount of change in the oil pressure value of the oil pump 54 with respect to the traveling distance of the vehicle (not shown), it is possible to determine whether or not the oil pressure value complies with expectations, thereby detecting/estimating the abnormal wear in the friction components (i.e., the pressure plate 23 and the friction plate 24) of the friction engagement portion 20a. That is, when the amount of change of the oil pressure value of the oil pump 54 exceeds a preset value within a predetermined time, or the difference between the oil pressure value of the oil pump 54 and the reference value exceeds a preset value, it can be determined that abnormal wear is generated in the friction components (i.e., the pressure plate 23 and the friction plate 24) of the friction engagement portion 20a. The above-described monitoring operation may be performed by an oil pressure sensor 54a (shown in FIG. 2) provided in the oil pump 54, that is, the oil pressure value of the oil pump 54 is obtained from the oil pressure sensor 54a, and may be performed by the sensor or other components provided in other components of the friction engagement device 20 without providing additional components for detection. The disclosure is not limited thereto, and may be adjusted according to needs and actual conditions.

As such, in the exemplary embodiment, by monitoring the value of the operation parameter of the friction engagement device 20, it is possible to detect/estimate whether or not abnormal wear is generated in the friction engagement portion 20a of the friction engagement device 20 without providing an additional component for detection. That is, the abnormal wear of the friction engagement portion 20a of the friction engagement device 20 may be obtained by monitoring at least one of the operation parameters of the friction engagement device 20 such as the current value of the motor 53 for driving the oil pump 54/the torque of the motor 53, the impedance value of the oil strainer 57, and the oil pressure value of the oil pump 54. Therefore, by obtaining the operating condition (i.e., the amount of change in the operation parameter) of one of the components such as the motor 53, the oil strainer 57 and the oil pump 54 during the traveling process of the vehicle (i.e., the operating process of the friction engagement device 20) through the sensor originally mounted in the components provided in the friction engagement device 20, it is possible to detect/estimate whether or not abnormal wear is generated in the friction engagement portion 20a of the friction engagement device 20.

Furthermore, the reference value or the preset value may be set as a value before which the oil pressure of the oil pump 54 drops to failure to cause the component to fall off, and may be stored in advance in a storage device of an electronic operating system (not shown) mounted on the vehicle. The monitoring result may be determined by a control component (not shown) of the vehicle with respect to the reference value or the preset value, and the determining result may also be provided to the driver (for example, by displaying on the electronic operating interface or generating an alarm sound) through the control component. In this manner, the driver can obtain that abnormal wear is generated in the friction engagement portion 20a of the friction engagement device 20, such that the friction engagement device 20 can be repaired or updated. However, the disclosure is not limited to the above embodiment, and may be adjusted as needed.

In summary, in the friction engagement device 20 of the disclosure, the oil pump 54 is driven by the motor 53 to operate the piston 33, and the friction components of the friction engagement portion 20a can be pressed by the piston 33, so that the friction engagement device 20 adjusts the driving force transmitted from the input shaft 5 to the output shaft (right axle 6R or left axle 6L). In the process, by monitoring the value of the operation parameters of the friction engagement device 20, for example, the current value of the motor 53 for driving the oil pump 54/the torque of the motor 53, the impedance value of the oil strainer 57 connected to the friction engagement device 20, or the oil pressure value of the oil pump 54, it is possible to detect/estimate the abnormal wear of the friction components of the friction engagement portion 20a. In this manner, the friction engagement device 20 of the disclosure is capable of estimating whether or not abnormal wear is generated in the friction engagement portion 20a by monitoring the operation parameters of the component provided in the friction engagement device 20 without providing an additional component.

In the friction engagement device according to an embodiment of the disclosure, the operation parameter of the friction engagement device includes a current value of the motor for driving the oil pump.

In the friction engagement device according to an embodiment of the disclosure, the current value of the motor is obtained from the torque of the motor.

In the friction engagement device according to an embodiment of the disclosure, the operation parameter of the friction engagement device includes an oil pressure value of the oil pump.

In the friction engagement device according to an embodiment of the disclosure, the oil pump is provided with an oil pressure sensor, and the oil pressure value is obtained by the oil pressure sensor.

In the friction engagement device according to an embodiment of the disclosure, the friction engagement device is connected to an oil strainer, and an operation parameter of the friction engagement device includes an impedance value of the oil strainer.

In the friction engagement device according to an embodiment of the disclosure, the housing includes an outer guide portion coupled to the input shaft, and an inner guide portion disposed on an inner diameter side of the outer guide portion and coupled to the output shaft, and the friction engagement portion is disposed between the outer guide portion and the inner guide portion.

Based on the above, in the friction engagement device of the disclosure, the piston is operated by the oil pump which is driven by the motor, and the friction components of the friction engagement portion can be pressed by the piston, such that the friction engagement device adjusts the driving force transmitted from the input shaft to the output shaft. In this process, the abnormal wear of the friction components of the friction engagement portion is detected/estimated by monitoring the value of the operation parameter of the friction engagement device. Accordingly, the friction engagement device of the disclosure is capable of estimating whether or not abnormal wear is generated in the friction engagement portion by monitoring the operation parameters of the component provided in the friction engagement device without being provided with an additional component.

What is claimed is:

1. A friction engagement device, connected to an input shaft and an output shaft to transmit a driving force from a driving source from the input shaft to the output shaft, wherein the friction engagement device comprises:
    a housing, disposed between the input shaft and the output shaft;
    a friction engagement portion, disposed in the housing and composed of a plurality of friction components;
    a piston, disposed on one side of the friction engagement portion for pressing the friction engagement portion;
    an oil pump, for operating the piston; and
    a motor, for driving the oil pump;
    wherein in the friction engagement device, a value of an operation parameter of the friction engagement device is monitored, and abnormal wear of the friction components of the friction engagement portion is detected when a difference between the value of the operation parameter being monitored and a predetermined reference value of the operation parameter being monitored exceeds a preset value, and
    wherein the operation parameter of the friction engagement device comprises a current value of the motor for driving the oil pump.

2. The friction engagement device according to claim 1, wherein the current value of the motor is obtained from a torque of the motor.

3. The friction engagement device according to claim 1, wherein the operation parameter of the friction engagement device comprises an oil pressure value of the oil pump.

4. The friction engagement device according to claim 3, wherein the oil pump is provided with an oil pressure sensor, and the oil pressure value of the oil pump is obtained from the oil pressure sensor.

5. The friction engagement device according to claim 1, wherein the friction engagement device is connected to an oil strainer, and the operation parameter of the friction engagement device comprises an impedance value of the oil strainer.

6. The friction engagement device according to claim 1, wherein the housing comprises:
    an outer guide portion coupled to the input shaft, and an inner guide portion disposed on an inner diameter side of the outer guide portion and coupled to the output shaft, wherein the friction engagement portion is disposed between the outer guide portion and the inner guide portion.

7. A friction engagement device, connected to an input shaft and an output shaft to transmit a driving force from a driving source from the input shaft to the output shaft, wherein the friction engagement device comprises:
    a housing, disposed between the input shaft and the output shaft;
    a friction engagement portion, disposed in the housing and composed of a plurality of friction components;
    a piston, disposed on one side of the friction engagement portion for pressing the friction engagement portion;
    an oil pump, for operating the piston; and
    a motor, for driving the oil pump;
    wherein in the friction engagement device, a value of an operation parameter of the friction engagement device is monitored, and abnormal wear of the friction components of the friction engagement portion is detected when a difference between the value of the operation parameter being monitored and a predetermined reference value of the operation parameter being monitored exceeds a preset value, and
    wherein the friction engagement device is connected to an oil strainer, and the operation parameter of the friction engagement device comprises an impedance value of the oil strainer.

* * * * *